(12) United States Patent
Lim et al.

(10) Patent No.: US 10,263,284 B2
(45) Date of Patent: Apr. 16, 2019

(54) NON-AQUEOUS LIQUID ELECTROLYTE AND LITHIUM SECONDARY BATTERY COMPRISING THE SAME

(71) Applicant: LG Chem, Ltd., Seoul (KR)

(72) Inventors: Young Min Lim, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 114 days.

(21) Appl. No.: 15/513,364

(22) PCT Filed: Sep. 25, 2015

(86) PCT No.: PCT/KR2015/010243
§ 371 (c)(1),
(2) Date: Mar. 22, 2017

(87) PCT Pub. No.: WO2016/048106
PCT Pub. Date: Mar. 31, 2016

(65) Prior Publication Data
US 2017/0309961 A1    Oct. 26, 2017

(30) Foreign Application Priority Data
Sep. 26, 2014 (KR) .................. 10-2014-0128885

(51) Int. Cl.
| H01M 4/505 | (2010.01) |
| H01M 4/525 | (2010.01) |
| H01M 10/0567 | (2010.01) |
| H01M 10/0568 | (2010.01) |
| H01M 10/052 | (2010.01) |
| H01M 10/0525 | (2010.01) |
| H01M 10/0569 | (2010.01) |

(52) U.S. Cl.
CPC ....... *H01M 10/0567* (2013.01); *H01M 4/505* (2013.01); *H01M 4/525* (2013.01); *H01M 10/052* (2013.01); *H01M 10/0525* (2013.01); *H01M 10/0568* (2013.01); *H01M 10/0569* (2013.01); *H01M 2300/0037* (2013.01)

(58) Field of Classification Search
CPC .. H01M 4/525; H01M 4/505; H01M 10/0567; H01M 10/0568; H01M 10/0569
See application file for complete search history.

(56) References Cited

U.S. PATENT DOCUMENTS

| 5,872,357 | A | 2/1999 | Flanagan | |
| 6,660,432 | B2 * | 12/2003 | Paulsen | C01G 51/42 423/596 |
| 2004/0091780 | A1 * | 5/2004 | Kinoshita | H01M 4/131 429/231.1 |
| 2005/0233217 | A1 * | 10/2005 | Fujihara | H01M 2/0285 429/231.1 |
| 2005/0287442 | A1 * | 12/2005 | Kim | H01M 10/052 429/326 |
| 2007/0054191 | A1 * | 3/2007 | Shirane | H01M 4/364 429/223 |
| 2010/0012886 | A1 * | 1/2010 | Ryu | H01M 4/1315 252/182.1 |
| 2012/0164519 | A1 | 6/2012 | Lee et al. | |
| 2012/0208070 | A1 * | 8/2012 | Nakashima | H01M 2/1646 429/158 |
| 2012/0258357 | A1 | 10/2012 | Kim | |
| 2013/0330609 | A1 | 12/2013 | Sawa et al. | |
| 2013/0330610 | A1 | 12/2013 | Shigematsu et al. | |
| 2014/0134501 | A1 | 5/2014 | Li et al. | |
| 2014/0186722 | A1 | 7/2014 | Lim et al. | |
| 2014/0199602 | A1 | 7/2014 | Kim et al. | |
| 2015/0249269 | A1 | 9/2015 | Yoon et al. | |

FOREIGN PATENT DOCUMENTS

| CN | 102498590 A | 6/2012 |
| CN | 103928708 A | 7/2014 |
| CN | 104011927 A | 8/2014 |
| JP | 2004342607 A | 12/2004 |
| JP | 2006012806 A | 1/2006 |
| KR | 20020043548 | 6/2002 |
| KR | 20050121172 A | 12/2005 |
| KR | 2006-0116423 A | 11/2006 |

(Continued)

OTHER PUBLICATIONS

International Search Report from PCT/KR2015/010243, dated Dec. 23, 2015.
International Search Report from Application No. PCT/KR2015/010133, dated Nov. 25, 2015.
Grunebaum, et al., "Synthesis and electrochemistry of polymer based electrolytes for lithium batteries." Progress in Solid State Chemistry, vol. 42, Isuse 4, Apr. 21, 2014, pp. 85-105.

(Continued)

*Primary Examiner* — Kenneth J Douyette
(74) *Attorney, Agent, or Firm* — Lerner, David, Littenberg, Krumholz & Mentlik, LLP

(57) ABSTRACT

The present disclosure provides a lithium secondary battery comprising a non-aqueous liquid electrolyte comprising lithium bis(fluorosulfonyl)imide (LiFSI) and a trimethylsilyl phosphate (TMSPa) additive, a positive electrode comprising a lithium-nickel-manganese-cobalt-based oxide as a positive electrode active material, a negative electrode and a separator.
The non-aqueous liquid electrolyte for a lithium secondary battery of the present disclosure is capable of forming a solid SEI membrane in the negative electrode when initially charging a lithium secondary battery comprising the same, is capable of improving an output property of the lithium secondary battery, and is also capable of enhancing an output property and a capacity property after high temperature storage.

10 Claims, No Drawings

(56) References Cited

FOREIGN PATENT DOCUMENTS

| KR | 20120090755 A | 8/2012 |
|---|---|---|
| KR | 20120115839 A | 10/2012 |
| KR | 20140036156 A | 3/2014 |
| KR | 20140040285 A | 4/2014 |
| KR | 20140066645 A | 6/2014 |
| KR | 20140082573 A | 7/2014 |

OTHER PUBLICATIONS

Sazhin et al., "Characterization of low-flammability electrolytes for lithium-ion batteries." Journal of Power Sources, vol. 196, Issue 7, 2001, pp. 3433-3438.

\* cited by examiner

NON-AQUEOUS LIQUID ELECTROLYTE AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2015/010243 filed Sep. 25, 2015, published in Korean, which claims priority from Korean Patent Application No. 10-2014-0128885, filed Sep. 26, 2014, the disclosures of which are incorporated herein by reference.

FIELD OF THE INVENTION

Technical Field

The present disclosure relates to a lithium secondary battery comprising a non-aqueous liquid electrolyte comprising lithium bis(fluorosulfonyl)imide (LiFSI) and a trimethylsilyl phosphate (TMSPa) additive, a positive electrode comprising a lithium-nickel-manganese-cobalt-based oxide as a positive electrode active material, a negative electrode and a separator.

Description of the Related Art

With increases in technology developments and demands for mobile devices, demands for secondary batteries as an energy source have rapidly increased, and among such secondary batteries, lithium secondary batteries having high energy density and voltage have been commercialized and widely used.

As a positive electrode active material of a lithium secondary battery, lithium metal oxides have been used, and as a negative electrode active material, lithium metal, lithium alloys, crystalline or amorphous carbon or carbon complexes have been used. A secondary battery is manufactured by applying the active material on a current collector to proper thickness and length or applying the active material itself in a film form, and winding or laminating the result with a separator, which is an insulator, to form an electrode group, then placing the result in a can or a container similar thereto, and then injecting a liquid electrolyte thereto.

Such a lithium secondary battery experiences charge and discharge while repeating intercalation and deintercalation of lithium ions from a lithium metal oxide of a positive electrode to a graphite electrode of a negative electrode. Herein, the lithium reacts with a carbon electrode due to high reactivity, and forms a membrane on the negative electrode surface by producing $Li_2CO_3$, LiO, LiOH and the like. Such a membrane is referred to as a solid electrolyte interface (SEI) membrane, and the SEI membrane formed at the beginning of charge prevents a reaction of lithium ions with a carbon negative electrode or other materials during charge and discharge. In addition, the SEI membrane performs a role of an ion tunnel and passes only lithium ions. This ion tunnel solvates lithium ions and performs a role of preventing the collapse of the carbon negative electrode structure by high molecular weight organic solvents of a liquid electrolyte moving together being co-intercalated to the carbon negative electrode.

Accordingly, a solid SEI membrane needs to be formed on a negative electrode of a lithium secondary battery in order to enhance a high temperature cycle property and a low temperature power output of the lithium secondary battery. Once the SEI membrane is formed at the initial charge, the film prevents a reaction of lithium ions with a negative electrode or other materials when repeating charge and discharge by battery use thereafter, and performs a role of an ion tunnel between a liquid electrolyte and the negative electrode passing only lithium ions.

In existing technologies, enhancement in the low temperature output property has been difficult to be expected in a liquid electrolyte that does not comprise a liquid electrolyte additive or comprises a liquid electrolyte additive having poor properties due to the formation of a non-uniform SEI membrane. Moreover, even when a liquid electrode additive is comprised but the amounts of the additive added are not adjusted to required amounts, there has been a problem in that a positive electrode surface is decomposed in a high temperature reaction due to the liquid electrolyte additive, or the liquid electrolyte causes an oxidation reaction and ultimately, irreversible capacity of a secondary battery increases and an output property declines.

DISCLOSURE OF THE INVENTION

Technical Problem

In view of the above, the present disclosure is directed to providing a non-aqueous liquid electrolyte for a lithium secondary battery capable of enhancing a lifespan property as well as improving an output property, and a lithium secondary battery comprising the same.

Technical Solution

One embodiment of the present disclosure provides a lithium secondary battery comprising a non-aqueous liquid electrolyte comprising lithium bis(fluorosulfonyl)imide (LiFSI) and a trimethylsilyl phosphate (TMSPa) additive, a positive electrode comprising a lithium-nickel-manganese-cobalt-based oxide as a positive electrode active material, a negative electrode and a separator.

In the lithium secondary battery, the non-aqueous liquid electrolyte may further comprise a lithium salt, and a mixing ratio of the lithium salt and the lithium bis(fluorosulfonyl)imide is from 1:0.01 to 1:1 in a molar ratio, and the lithium bis(fluorosulfonyl)imide has a concentration of 0.01 mol/l to 2 mol/l in the non-aqueous liquid electrolyte.

The lithium-nickel-manganese-cobalt-based oxide may comprise an oxide represented by the following Chemical Formula 1.

   [Chemical Formula 1]

In Chemical Formula 1, 0.55≤a≤0.65, 0.18≤b≤0.22, 0.18≤c≤0.22, −0.2≤x≤0.2 and x+a+b+c=1.

Advantageous Effects

A non-aqueous liquid electrolyte for a lithium secondary battery of the present disclosure is capable of forming a solid SEI membrane in a negative electrode when initially charging a lithium secondary battery comprising the same, is capable of improving an output property of the lithium secondary battery, and is also capable of enhancing an output property and a capacity property after high temperature storage.

MODE FOR CARRYING OUT THE INVENTION

Hereinafter, the present disclosure will be described in more detail in order to illuminate the present disclosure.

Terms or words used in the present specification and the claims are not to be interpreted limitedly to common or dictionary definitions, and shall be interpreted as meanings and concepts corresponding to technological ideas of the present disclosure based on a principle in which the inventors may suitably define the concepts of terms in order to describe the invention in the best possible way.

A non-aqueous liquid electrolyte according to one embodiment of the present disclosure comprises lithium bis(fluorosulfonyl)imide (LiFSI).

By the lithium bis(fluorosulfonyl)imide being added to the non-aqueous liquid electrolyte as a lithium salt to form a solid and thin SEI membrane in a negative electrode, a low temperature output property is improved, and in addition to this, decomposition of a positive electrode surface, which may occur during high temperature cycle operations, may be suppressed, and an oxidation reaction of a liquid electrolyte may be prevented. Moreover, the SEI membrane produced in the negative electrode is thin and therefore, may more smoothly transfer lithium ions in the negative electrode, and as a result, an output of a secondary battery may be enhanced.

According to one embodiment of the present disclosure, a concentration of the lithium bis(fluorosulfonyl)imide in the non-aqueous liquid electrolyte is preferably from 0.01 mol/l to 2 mol/l and more preferably from 0.01 mol/l to 1 mol/l. When the concentration of the lithium bis(fluorosulfonyl)imide is less than 0.1 mol/l, effects of low temperature output improvement and high temperature cycle property improvement in a lithium secondary battery are insignificant, and when the concentration of the lithium bis(fluorosulfonyl)imide is greater than 2 mol/l, side reactions in the liquid electrolyte may excessively occur during charge and discharge of a battery leading to a swelling phenomenon, and corrosion of a positive electrode or negative electrode current collector made of metals may occur in the liquid electrolyte.

In order to prevent such side reactions, the non-aqueous liquid electrolyte of the present disclosure may further comprise a lithium salt. As the lithium salt, lithium salts commonly used in the art may be used, and examples thereof may comprise any one selected from the group consisting of $LiPF_6$, $LiAsF_6$, $LiCF_3SO_3$, $LiBF_6$, $LiSbF_6$, $LiN(C_2F_5SO_2)_2$, $LiAlO_4$, $LiAlCl_4$, $LiSO_3CF_3$ and $LiClO_4$, or a mixture of two or more thereof.

A mixing ratio of the lithium salt and the lithium bis(fluorosulfonyl)imide is preferably 1:0.01 to 1 in a molar ratio. The mixing ratio of the lithium salt and the lithium bis(fluorosulfonyl)imide being greater than the above-mentioned molar ratio range may lead to a swelling phenomenon since side reactions excessively occur in the liquid electrolyte during charge and discharge of a battery, and when the mixing ratio is less than the above-mentioned molar ratio range, enhancement in the produced secondary battery output may be reduced. Specifically, when the mixing ratio of the lithium salt and the lithium bis(fluorosulfonyl)imide is less than 1:0.01 in a molar ratio, a large capacity irreversible reaction may occur during a process forming a SEI membrane in a lithium ion battery, and a process inserting lithium ions solvated by a carbonate-based solvent into between negative electrodes, and effects of improving a low temperature output, improving a cycle property and a capacity property after high temperature storage may be insignificant due to the stripping of a negative electrode surface layer (for example, carbon surface layer) and the decomposition of a liquid electrolyte. When the mixing ratio of the lithium salt and the lithium bis(fluorosulfonyl)imide is greater than 1:1 in a molar ratio, excessive capacity of the lithium bis(fluorosulfonyl)imide is comprised in the liquid electrolyte causing corrosion of an electrode current collector during charge and discharge, which may affect the stability of a secondary battery.

The positive electrode active material that is a lithium-nickel-manganese-cobalt-based oxide may comprise an oxide represented by the following Chemical Formula 1.

[Chemical Formula 1]

In Chemical Formula 1, $0.55 \leq a \leq 0.65$, $0.18 \leq b \leq 0.22$, $0.18 \leq c \leq 0.22$, $-0.2 \leq x \leq 0.2$ and $x+a+b+c=1$.

By using the positive electrode active material that is a lithium-nickel-manganese-cobalt-based oxide in a positive electrode, synergistic effects may be obtained through the combination with the lithium bis(fluorosulfonyl)imide. As the Ni content in the transition metal increases, the lithium-nickel-manganese-cobalt-based oxide positive electrode active material undergoes cation mixing, a phenomenon in which positions of Li monovalent ions and Ni divalent ions in the layer structure of the positive electrode active material switch, during charge and discharge processes, and the structure is destroyed, and as a result, the positive electrode active material causes side reactions with a liquid electrolyte, causes transition metal elution, or the like. This is due to the fact that sizes of Li monovalent ions and Ni divalent ions are similar. As a result, battery performance readily declines through the side reactions due to depletion of the liquid electrolyte and structure collapse of the positive electrode active material in the secondary battery.

On this account, the inventors of the present disclosure have found out a range capable of sufficiently securing a nickel transition metal amount for securing positive electrode active material capacity while suppressing a cation mixing phenomenon of Li monovalent ions and Ni divalent ions by forming a layer with LiFSI-based components on a positive electrode surface using a liquid electrolyte using LiFSI in the positive electrode active material of Chemical Formula 1 according to one embodiment of the present disclosure. According to the positive electrode active material comprising an oxide according to Chemical Formula 1 of the present disclosure, side reactions with a liquid electrolyte, metal elution and the like may be effectively suppressed when using a liquid electrolyte using LiFSI.

Particularly, when the Ni transition metal ratio is greater than 0.65 in the oxide represented by Chemical Formula 1, excess Ni is comprised in the positive electrode active material, and the cation mixing phenomenon of Li monovalent ions and Ni divalent ions may not be suppressed even with the layer produced with LiFSI on the electrode surface described above.

Moreover, when comprising excess Ni transition metal in the positive electrode active material, the nickel transition metal having d orbitals needs to have a regular octahedron structure due to changes in the oxidation number of Ni, however, a twisted octahedron is formed since the order of energy levels is reversed or the oxidation number changes (heterogenized reaction) by an external energy supply in an environment of high temperature and the like. As a result, the positive electrode active material crystal structure comprising nickel transition metal is transformed increasing the probability of nickel metal elution in the positive electrode active material.

Consequently, the inventors of the present disclosure have identified that, when combining a positive electrode active material comprising an oxide in the range of Chemical Formula 1 and a LiFSI salt, excellent efficiency is obtained in high temperature stability and a capacity property while producing a high output.

In the case of $LiPF_6$ that is a lithium salt, a liquid electrolyte having insufficient thermal safety is readily decomposed in a battery forming LiF and $PF_5$. Herein, the LiF salt reduces conductivity and the number of free $Li^+$ ions increasing battery resistance and resultantly reduces battery capacity. In other words, such decomposition of $PF_6^-$ ions on a positive electrode surface, which may occur during high temperature cycle operations, may be prevented by a phosphate functional group of trimethylsilyl phosphate (TMSPa) functioning as an anion receptor, and the phosphate functional group of trimethylsilyl phosphate (TMSPa) induces stable formation of $PF_6^-$, increases $Li^+$ and $PF_6^-$ ion pair separation, and consequently, may lower interfacial resistance by improving solubility of LiF in the liquid electrolyte. Accordingly, in the mixing of $LiPF_6$ and lithium bis(fluorosulfonyl)imide that are lithium salts according to one embodiment of the present disclosure, an effect of preventing side reactions that may occur when using a large quantity of lithium bis(fluorosulfonyl)imide may be obtained by lowering interfacial resistance at high temperatures.

Moreover, the trimethylsilyl phosphate (TMSPa) compound is added to a liquid electrolyte to perform a role of forming a solid SEI membrane on a negative electrode surface together with the lithium bis(fluorosulfonyl)imide. Furthermore, the trimethylsilyl phosphate (TMSPa) compound may suppress gas generated from liquid electrolyte decomposition caused by the reaction between the negative electrode surface and the liquid electrolyte inside a battery, and therefore, may improve a lifespan property of a lithium secondary battery. Accordingly, the trimethylsilyl phosphate (TMSPa)-added lithium secondary battery according to one embodiment of the present disclosure is capable of more effectively enhancing an output property, and improving a lifespan property.

Herein, the content of the trimethylsilyl phosphate (TMSPa) compound may be from, for example, 0.01% by weight to 5% by weight based on the total amount of the liquid electrolyte. When the amount of the trimethylsilyl phosphate (TMSPa) compound is less than 0.01% by weight, effects of solid SEI membrane formation and an anion receptor role obtained from the addition are difficult to be sufficiently obtained, and the amount of the trimethylsilyl phosphate (TMSPa) compound being greater than 5% by weight may lead to a problem of increasing irreversible capacity or increasing negative electrode resistance by forming the SEI membrane too thick while the degree of increase in the effects is limited.

Particularly, the amount of the trimethylsilyl phosphate (TMSPa) compound may be adjusted depending on the amount of the lithium bis(fluorosulfonyl)imide added, which is for more efficiently preventing side reactions that may be caused from adding a large amount of lithium bis(fluorosulfonyl)imide.

In addition, the non-aqueous organic solvent that may be comprised in the non-aqueous liquid electrolyte is not particularly limited as long as it is capable of minimizing decomposition caused by an oxidation reaction and the like during charge and discharge of a battery, and exhibiting target properties with additives. Examples thereof may comprise nitrile-based solvents, cyclic carbonate, linear carbonate, ester, ether, ketone or the like. These may be used either alone or as a combination of two or more.

Carbonate-based organic solvents may be readily used among the organic solvents, and the cyclic carbonate is any one selected from the group consisting of ethylene carbonate (EC), propylene carbonate (PC) and butylene carbonate (BC), or a mixture of two or more thereof, and the linear carbonate is any one selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC), or a mixture of two or more thereof.

The nitrile-based solvent may be one or more selected from the group consisting of acetonitrile, propionitrile, butyronitrile, valeronitrile, carprilonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile and 4-fluorophenylacetonitrile, and the non-aqueous solvent according to one embodiment of the present disclosure may use acetonitrile.

Meanwhile, the lithium secondary battery according to one embodiment of the present disclosure may comprise a positive electrode, a negative electrode, a separator provided between the positive electrode and the negative electrode, and the non-aqueous liquid electrolyte. The positive electrode and the negative electrode may comprise the positive electrode active material and the negative electrode active material, respectively, according to one embodiment of the present disclosure.

Meanwhile, the negative electrode active material comprises amorphous carbon or crystalline carbon, and specifically, may use carbon such as hard carbon and graphite-based carbon; metal complex oxides such as $Li_xFe_2O_3$ ($0 \le x \le 1$), $Li_xWO_2$ ($0 \le x \le 1$) and $Sn_xMe_{1-x}Me'yO_z$ (Me: Mn, Fe, Pb, Ge; Me': Al, B, P, Si, elements of groups 1, 2 and 3 in the periodic table, halogen; $0 < x \le 1$; $1 \le y \le 3$; $1 \le z \le 8$); lithium metal; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ or $Bi_2O_5$; conductive polymers such as polyacetylene; Li—Co—Ni-based materials and the like.

In addition, as the separator, a porous polymer film, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer may be used either alone or as a laminate of two or more thereof. Common porous non-woven fabrics, for example, non-woven fabrics made of high melting point glass fiber, polyethylene terephthalate fiber or the like may also be used, however, the separator is not limited thereto.

The secondary battery may have various forms comprising a cylinder-type, a square-type, a pouch-type and the like depending on the use, and is not limited to the constitutions known in the art. The lithium secondary battery according to one embodiment of the present disclosure may be a pouch-type secondary battery.

Hereinafter, the present disclosure will be described in more detail with reference to examples and test examples, however, the present disclosure is not limited to these examples and test examples.

EXAMPLE

Example 1

[Preparation of Liquid Electrolyte]

A non-aqueous liquid electrolyte was prepared by mixing a non-aqueous organic solvent having a composition of ethylene carbonate (EC):ethylmethyl carbonate (EMC)=3:7

(volume ratio), 0.9 mol/L of $LiPF_6$ and 0.1 mol/L of lithium bis(fluorosulfonyl)imide based on the total amount of the non-aqueous liquid electrolyte as a lithium salt, and 0.5% by weight of trimethylsilyl phosphate (TMSPa) compound based on the total weight of the non-aqueous liquid electrolyte as an additive.

[Manufacture of Lithium Secondary Battery]

Positive electrode mixture slurry was prepared by adding 92% by weight of $Li(Ni_{0.6}Co_{0.2}Mn_{0.2})O_2$ as a positive electrode active material, 4% by weight of carbon black as a conductor and 4% by weight of polyvinylidene fluoride (PVdF) as a binder to N-methyl-2-pyrrolidone (NMP), a solvent. The positive electrode mixture slurry was applied on an aluminum (Al) thin film, a positive electrode current collector, having a thickness of approximately 20 μm, and the result was dried and roll pressed to prepare a positive electrode.

In addition, negative electrode mixture slurry was prepared by adding 96% by weight of carbon powder as a negative electrode active material, 3% by weight of PVdF as a binder, and 1% by weight of carbon black as a conductor to NMP, a solvent. The negative electrode mixture slurry was applied on a copper (Cu) thin film, a negative electrode current collector, having a thickness of 10 μm, and the result was dried and roll pressed to prepare a negative electrode.

After preparing a polymer-type battery with the positive electrode and the negative electrode prepared as above, and a separator formed with three layers of polypropylene/polyethylene/polypropylene (PP/PE/PP) using a common method, the prepared non-aqueous liquid electrolyte was injected thereto to complete the manufacture of a lithium secondary battery.

Example 2

A non-aqueous liquid electrolyte and a lithium secondary battery were prepared in the same manner as in Example 1 except that, as the lithium salt, 0.7 mol/L of $LiPF_6$ and 0.3 mol/L of lithium bis(fluorosulfonyl)imide were used based on the total amount of the non-aqueous liquid electrolyte.

Example 3

A non-aqueous liquid electrolyte and a lithium secondary battery were prepared in the same manner as in Example 1 except that, as the lithium salt, 0.6 mol/L of $LiPF_6$ and 0.4 mol/L of lithium bis(fluorosulfonyl)imide were used based on the total amount of the non-aqueous liquid electrolyte.

Example 4

A non-aqueous liquid electrolyte and a lithium secondary battery were prepared in the same manner as in Example 1 except that, as the lithium salt, 0.5 mol/L of $LiPF_6$ and 0.5 mol/L of lithium bis(fluorosulfonyl)imide were used based on the total amount of the non-aqueous liquid electrolyte.

Comparative Example 1

A non-aqueous liquid electrolyte and a lithium secondary battery were prepared in the same manner as in Example 1 except that, as the lithium salt, 0.4 mol/L of $LiPF_6$ and 0.6 mol/L of lithium bis(fluorosulfonyl)imide were used based on the total amount of the non-aqueous liquid electrolyte.

Comparative Example 2

A non-aqueous liquid electrolyte and a lithium secondary battery were prepared in the same manner as in Example 2 except that the additive was not used.

Comparative Example 3

A non-aqueous liquid electrolyte and a lithium secondary battery were prepared in the same manner as in Example 2 except that $Li(Ni_{0.5}Co_{0.3}Mn_{0.2})O_2$ was used as the positive electrode active material.

Test Example

<Low Temperature Output Property>

Outputs were calculated using a voltage difference generated when charging and discharging the secondary batteries manufactured in Examples 1 to 4 and Comparative Examples 1 to 3 for 10 seconds with 0.5 C at −30° C. Herein, the output of Comparative Example 1 was 4.2 W. Outputs of Examples 1 to 4 and Comparative Examples 2 and 3 were calculated as percentages based on Comparative Example 1. The results are shown in the following Table 1. The tests were carried out at a 50% state of charge (SOC).

<Room Temperature Output Property>

Outputs were calculated using a voltage difference generated when charging and discharging the secondary batteries manufactured in Examples 1 to 4 and Comparative Examples 1 to 3 for 10 seconds with 0.5 C at 23° C. Herein, the output of Comparative Example 1 was 43.4 W. Outputs of Examples 1 to 4 and Comparative Examples 2 and 3 were calculated as percentages based on Comparative Example 1. The results are shown in the following Table 1. The tests were carried out at a 50% state of charge (SOC).

<Output Property after High Temperature Storage>

Outputs were calculated using a voltage difference generated when charging and discharging the secondary batteries manufactured in Examples 1 to 4 and Comparative Examples 1 to 3 for 10 seconds with 5 C at 23° C. after storing the secondary batteries for 24 weeks at 60° C. Herein, the output of Comparative Example 1 was 37.3 W. Outputs of Examples 1 to 4 and Comparative Examples 2 and 3 were calculated as percentages based on Comparative Example 1. The results are shown in the following Table 1. The tests were carried out at a 50% state of charge (SOC).

TABLE 1

| | Output Property(%)-based on Comparative Example 1 | | |
|---|---|---|---|
| | Low Temperature Output Property | Room Temperature Output Property | Output Property after High Temperature Storage |
| Example 1 | 3.25 | 1.89 | 7.21 |
| Example 2 | 8.87 | 4.27 | 18.36 |
| Example 3 | 5.32 | 3.39 | 12.87 |
| Example 4 | 2.91 | 2.11 | 7.5 |
| Comparative Example 1 | — | — | — |
| Comparative Example 2 | −0.95 | −1.63 | −6.32 |
| Comparative Example 3 | −4.12 | −2.31 | −9.89 |

As shown in Table 1, it was seen that the secondary batteries of Examples 1 to 4 exhibited excellent outputs in the low temperature and room temperature outputs by approximately 3% to 12% compared to the secondary batteries of Comparative Examples 1 to 3. Particularly, the secondary batteries of Examples 1 to 4 used a trimethylsilyl phosphate-based (TMSPa) compound as an additive and had enhanced stability at high temperatures, and exhibited more superior output property by maximum of 28% or higher in the output property after high temperature storage compared to the secondary batteries of Comparative Examples 1 to 3.

<Room Temperature Lifespan Property>

The lithium secondary batteries of Examples 1 to 4, and Comparative Examples 1 to 3 were charged up to 4.2 V/38 mA with 1 C under a constant current/constant voltage (CC/CV) condition at 23° C., then discharged down to 2.5 V with 3 C under a constant current (CC) condition, and the discharge capacity was measured. This was repeated with 1 to 800 cycles, and the discharge capacity measured by calculating the $800^{th}$ cycle as a percentage based on the first cycle (capacity at $800^{th}$/capacity at first*100(%)) is shown in Table 2.

<High Temperature Lifespan Property>

The lithium secondary batteries of Examples 1 to 4, and Comparative Examples 1 to 3 were charged up to 4.2 V/38 mA with 1 C under a constant current/constant voltage (CC/CV) condition at 45° C., then discharged down to 2.5 V with 3 C under a constant current (CC) condition, and the discharge capacity was measured. This was repeated with 1 to 800 cycles, and the discharge capacity measured by calculating the $800^{th}$ cycle as a percentage based on the first cycle (capacity at $800^{th}$/capacity at first*100(%)) is shown in Table 2.

TABLE 2

| | Lifespan Property (%) | |
| --- | --- | --- |
| | Room Temperature Lifespan Property | High Temperature Lifespan Property |
| Example 1 | 81.3 | 77.1 |
| Example 2 | 86.6 | 81.9 |
| Example 3 | 83.1 | 78.7 |
| Example 4 | 81.2 | 76.5 |
| Comparative Example 1 | 78.4 | 73.2 |
| Comparative Example 2 | 76.6 | 72.6 |
| Comparative Example 3 | 68.9 | 63.9 |

As shown in Table 2, it was identified that the lithium secondary batteries of Example 1 to Example 4 exhibited more superior lifespan properties at room temperature and a high temperature compared to the lithium secondary batteries of Comparative Examples 1 to 3. It was seen that Comparative Example 3 using $Li(Ni_{0.5}Co_{0.3}Mn_{0.2})O_2$ as a positive electrode active material had significantly declined high temperature lifespan property and room temperature lifespan property.

What is claimed is:

1. A lithium secondary battery comprising:
a non-aqueous liquid electrolyte comprising lithium bis(fluorosulfonyl)imide (LiFSI) and a trimethylsilyl phosphate (TMSPa) additive;
a positive electrode comprising a lithium-nickel-manganese-cobalt-based oxide as a positive electrode active material;
a negative electrode; and
a separator,
wherein the lithium-nickel-manganese-cobalt-based oxide comprises an oxide represented by the following Chemical Formula 1:

$Li_{1+x}(Ni_aCo_bMn_c)O_2$ 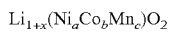 [Chemical Formula 1]

wherein, in Chemical Formula 1, $0.55 \le a \le 0.65$, $0.18 \le b \le 0.22$, $0.18 \le c \le 0.22$, $-0.2 \le x \le 0.2$ and $x+a+b+c=1$.

2. The lithium secondary battery of claim 1, wherein the non-aqueous liquid electrolyte further comprises a lithium salt.

3. The lithium secondary battery of claim 2, wherein a mixing ratio of the lithium salt and the lithium bis(fluorosulfonyl)imide is 1:0.01 to 1:1.

4. The lithium secondary battery of claim 1, wherein a concentration of the lithium bis(fluorosulfonyl)imide in the non-aqueous liquid electrolyte is from 0.01 mol/L to 2 mol/L.

5. The lithium secondary battery of claim 2, wherein the lithium salt comprises any one selected from the group consisting of $LiPF_6$, $LiAsF_6$, $LiCF_3SO_3$, $LiN(CF_3SO_2)_2$, $LiBF_6$, $LiSbF_6$, $LiN(C_2F_5SO_2)_2$, $LiAlO_4$, $LiAlCl_4$, $LiSO_3CF_3$ and $LiClO_4$, or a mixture of two or more thereof.

6. The lithium secondary battery of claim 1, wherein the non-aqueous organic solvent comprises a nitrile-based solvent, linear carbonate, cyclic carbonate, ester, ether, ketone or a combination thereof.

7. The lithium secondary battery of claim 6, wherein the cyclic carbonate is any one selected from the group consisting of ethylene carbonate (EC), propylene carbonate (PC) and butylene carbonate (BC), or a mixture of two or more thereof, and the linear carbonate is any one selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC), or a mixture of two or more thereof.

8. The lithium secondary battery of claim 6, wherein the nitrile-based solvent is one or more selected from the group consisting of acetonitrile, propionitrile, butyronitrile, valeronitrile, carprilonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile and 4-fluorophenylacetonitrile.

9. The lithium secondary battery of claim 1, wherein the trimethylsilyl phosphate (TMSPa) additive is comprised in 0.01% by weight to 5% by weight based on a total weight of the non-aqueous liquid electrolyte.

10. The lithium secondary battery of claim 1, which is a pouch-type lithium secondary battery.

* * * * *